United States Patent
Wein et al.

(10) Patent No.: US 7,894,144 B2
(45) Date of Patent: Feb. 22, 2011

(54) HIGH ACCURACY OPTICAL POINTING APPARATUS

(75) Inventors: Steven J. Wein, Sudbury, MA (US); James D. Targove, Lunenburg, MA (US); Arthur Menikoff, Harvard, MA (US); Dennis P. Bowler, Sudbury, MA (US); David J. Korwan, Westford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 495 days.

(21) Appl. No.: 11/991,029

(22) PCT Filed: Jun. 8, 2007

(86) PCT No.: PCT/US2007/013518
§ 371 (c)(1),
(2), (4) Date: Feb. 26, 2008

(87) PCT Pub. No.: WO2007/143222
PCT Pub. Date: Dec. 13, 2007

(65) Prior Publication Data
US 2010/0220390 A1    Sep. 2, 2010

Related U.S. Application Data

(60) Provisional application No. 60/804,297, filed on Jun. 9, 2006.

(51) Int. Cl.
*G02B 7/02* (2006.01)
(52) U.S. Cl. ..................................... 359/811; 359/813
(58) Field of Classification Search .................. 359/694, 359/811, 813, 819; 244/173, 167, 168
See application file for complete search history.

(56) References Cited

U.S. PATENT DOCUMENTS

| | | | |
|---|---|---|---|
| 4,747,567 A * | 5/1988 | Johnson et al. ........... 244/172.6 |
| 6,327,065 B1 | 12/2001 | Danial et al. |
| 7,388,146 B2 * | 6/2008 | Fraas et al. .................. 136/246 |
| 2002/0043949 A1 | 4/2002 | Christison et al. |
| 2004/0173726 A1 | 9/2004 | Mercadal et al. |

FOREIGN PATENT DOCUMENTS

JP        2006106910        4/2006

* cited by examiner

*Primary Examiner*—Timothy J Thompson
(74) *Attorney, Agent, or Firm*—Daniel J. Long; Robert K. Tendler

(57) ABSTRACT

In the subject three-axis pointing system, the elevation and tip mirror axes are permanently mounted with their rotation axes orthogonal to each other to eliminate gimbal lock over the hemisphere, to avoid high accelerations as the zenith or nadir pointing directions are approached, and to provide optimal two-axis beam pointing control.

18 Claims, 3 Drawing Sheets

HIGH ACCURACY OPTICAL POINTING APPARATUS

RELATED APPLICATIONS

This Application claims rights under 35 USC §119(e) from U.S. Application Ser. No. 60/804,297 filed Jun. 9, 2006, the contents of which are incorporated herein by reference.

FIELD OF THE INVENTION

This invention relates to the field of optical pointing and tracking systems, and more particularly to optical pointing and tracking systems that require high-speed pointing and high accuracy over a large field of regard.

BACKGROUND OF THE INVENTION

Three-axis gimbal-based beam director and receiver systems in general provide a hemispherical field of regard and in some instances a hyper-hemispherical field of regard, which refers to a field of regard greater than 180 degrees.

Borrowing from astronomical telescopes, it is a requirement that the telescope be able to point anywhere in the sky. In order to do that, a two-axis system is employed that points the telescope utilizing an azimuth gimbal that rotates the telescope around in a horizontal direction, commonly known as dome rotating. The other pointing axis is the elevation axis, which points up from the horizontal azimuth axis such that it is possible to direct the telescope to point anywhere within the hemisphere.

The problem in controlling such a telescope is the ability to point. at a position in space that is located straight up (zenith) or straight down (nadir). The difficulty to point in these directions and to be able to maneuver the telescope about these straight up and down directions is called gimbal lock, in some instances referred to as zenith lock.

Taking, for instance, if one is looking towards the zenith where one is pointing straight up, if one spins in azimuth utilizing the azimuth gimbal, the point of the optical axis of the telescope does not move because as the azimuth gimbal moves, the beam pointing is in the same direction. Thus, while the azimuth gimbal provides motion in the azimuth direction, one is still spinning around a fixed point in space. As a result, the ability to control a second direction is lost when pointing straight up or straight down.

The result is that if one is trying to track an object that is directly overhead or close to overhead, the azimuth gimbal is ineffective to move the telescope pointing direction.

By way of example, consider some other point such as, for instance, a satellite or an object moving perpendicular to the direction that the elevation gimbal provides. If the target is moving perpendicular to the azimuth there is no way to track the movement of the object when it is at the zenith of the system. Thus, when a target is at the zenith, one cannot track it by spinning the azimuth axis. Similarly, when the object is close to the zenith or nadir directions, the azimuth gimbal has to spin at increasingly faster rates to provide ever-diminishing amounts of motion until at zenith, no motion is provided by the azimuth gimbal even with rates approaching infinity.

The result is what is called "gimbal lock" in that one is locked to motion in only one direction. When looking in this direction, one cannot track or stabilize in other directions. As a result, if one is tracking an object that is at or near the zenith of the system, one cannot track in a direction that is orthogonal to the elevation axis.

Moreover, with respect to line-of-sight stabilization, one normally tries to stabilize in two directions. However, if the object to be stabilized on is directly above or below the gimbaling system, one can only stabilize on one axis or equivalently, in only one direction. As a result one loses the ability to stabilize the line of sight of the system along a second direction.

In summary, gimbal lock fundamentally eliminates the ability to track or stabilize objects that are at or close to the zenith or nadir of the system. This problem of gimbal lock is a well-known problem and in the past three-axis systems were utilized instead of two-axis systems to solve the gimbal lock problem. If one has an additional gimbal either inside or outside the two-axis system, one can eliminate gimbal lock by choosing configurations or control algorithms that ensure that 2 axes are never aligned when one of the 3 rotation axes is aligned with the line-of-sight direction. This would result in only a single axis of control.

In such systems the azimuth and elevation axes are always perpendicular to each other. There are, however, occasions when using a third axis on the inside or outside of the two-axis system, the third axis can be lined up with one of the two other axes depending on where one is pointing.

However, if one is not careful with the control algorithms one can obtain a situation in which the orientation of the third axis can line up with one of the two other axes. Where one has an accidental lineup, one only has two axes available, which again reverts to the two-axis gimbal lock problem.

Thus, one wants to establish the case where when providing for the three different axes, one avoids the situation in which two of the axes line up one with the other while any one of the axes is aligned along the line-of-sight.

While control algorithms exist to make sure that the third axis does not result in the lining up of any two axes, installing a third gimbal in the past has added increased weight and considerably more mechanical complexity. Thus, if one provides a third gimbal within the other two gimbals, the gimbal system tends to be heavy and the positioning is not particularly rapid due to the mass of the third gimbal. Also one needs big torque motors and low-friction bearings to obtain quick stabilization or pointing response. Thus, these three-gimbal systems suffer from reduced bandwidth and increased inertia. Also, providing a third gimbal occupies a considerable amount of volume.

What is therefore required is a system for providing a low mass, high-speed third axis that does not require additional volume and achieves high-speed tracking and pointing with increased bandwidth.

More specifically, the third-axis gimbal described above is characterized by slower accelerations and lower bandwidths for the outer gimbal. The accelerations are angular accelerations, which refer to how fast one can rotate an object about the axis. The bandwidth is the frequency by which one can track disturbances. If one has random disturbances such as those associated with aircraft, one would have random motions of the airframe that may, for instance, be caused by vibration. A tracking system must be able to cancel these random motions by providing a system with high bandwidth, meaning a system that can compensate for high-frequency disturbances.

Thus, if one has high bandwidth one can track something that is uttering at a high frequency, whereas if one has a low bandwidth, one can only track something or stabilize the line of sight if the apparatus base or other components are vibrating very slowly.

It is noted that if one has enough power and a strong-enough motor, one can drive a three-axis system to accommodate fast jitter, albeit at the expense of weight, size and power.

Moreover, while it is theoretically possible in conventional three-axis mechanical gimbaling configurations to push the gimbal lock to 90 degrees away or to some other point where gimbal locking is not a problem, i.e., to move the gimbal lock position to regions or locations that are not of interest, such gimbal lock positioning is not always possible.

In particular, one would like to have line-of-sight stabilization about the pointing direction utilizing high-bandwidth, low-inertia line-of-sight stabilization around any point position within the hemisphere. Thus, if one is pointing at any arbitrary angle, one needs two degrees of control, typically one up and down and the other left and right, i.e., one vertical and one horizontal. Thus, no matter where one points, one needs up-down and left-right stabilization.

When providing a three-axis system, there is a second consideration. If one can provide orthogonal axes that are high-bandwidth, low mass and truly orthogonal to each other, this configuration provides the best pointing direction control. Assuming that wherever one is looking within the hemisphere, one has two axes of control that are truly 90 degrees to each other, one can provide simplified pointing control.

The advantage of having two orthogonal control axes about the pointing position is that it allows one to decouple the control system. Rather than having a two-dimensional controller, one can have two one-dimensional controllers, one for each control axis.

Thus, instead of trying to control two axes simultaneously, one seeks to control them separately, which minimizes the mathematical complexity. The result is that rather than having a controller that is moving two axes simultaneously, by decoupling the control and separately controlling the two axes, one can simplify the mathematics.

A second important reason to be able to de-couple the control about the pointing direction is that one typically has feedback systems that measure the position of the optical axis. Upon detecting which way the optical axis is moving one needs a feedback system including transducers to correct the pointing direction.

It is noted that feedback sensors inform one of what errors there are in the pointing direction. If these sensors are placed on the two orthogonal axes they measure error in these axial directions. Having measured errors along these axes, then movements of the actuators on these two axes may be easily controlled by the error signals.

Thus, if one measures the errors on the same axes as those utilized for the transduction of the pointing direction, then feedback systems are greatly simplified.

SUMMARY OF INVENTION

Rather than utilizing three-axis gimbal systems involving a massive third gimbal and complicated control algorithms to avoid gimbal lock, in the subject system a tip mirror is mounted to an elevation gimbal such that the axis of rotation of the tip mirror is always orthogonal to the axis of rotation of the elevation gimbal. This provides two-axis control about the pointing direction of the pointing system, which it has been found eliminates gimbal lock when pointing anywhere in the hemisphere when the range of the tip mirror is limited to less than 90 degrees.

The use of an orthogonally oriented tip mirror and elevation gimbal also permits de-coupling of the tip mirror axis from the elevation gimbal axis to simplify pointing control.

Moreover, when the elevation gimbal and the tip mirror are made of lightweight materials, inertia is minimized and bandwidth is maximized to provide a two-axis pointing system having a high bandwidth and low inertia for improved stabilization and jitter control.

More particularly, in the subject system a three-axis beam director or receiver is provided in which the elevation and tip mirror axes are permanently mounted with their rotation axes orthogonal to each other. This always provides two active control axes. In a preferred embodiment, the azimuth gimbal is used to orient the gimbal system in such a manner as to orient the elevation and tip mirror control axes such that they are orthogonal to the Line of Sight.

The point is that the elevation and tip mirror control axes are always orthogonal to each other, but do not need to both be orthogonal to the Line of Sight for the system to work. Note that the tip mirror is always orthogonal, whereas the elevation gimbal sometimes is. A preferred embodiment uses a control algorithm that rotates the outer azimuth gimbal such that the tip mirror and elevation gimbal axes are maintained orthogonal to the line of sight.

It has been found that two-orthogonal-axes line-of-sight stabilization eliminates "gimbal lock." This is because the subject system always provides two orthogonal axes of control when the system is pointed anywhere within a hemispherical field-of-regard.

Note that it has been found that gimbal lock is always avoided by limiting the mechanical range of the tip mirror to less than 90 degrees such that the line of sight is not directed back along the rotation axis of the elevation gimbal. This is not a meaningful limitation since the two orthogonal axes of control typically need to be stabilized in the line-of-sight direction to only a few degrees of motion, in one embodiment ±10°. However, the subject system can avoid gimbal lock up to much larger angles as long as the tip mirror angle stays less than 90 degrees.

In one embodiment, a three-axis beam director or receiver apparatus provides a hemispherical field of regard or hyper-hemispherical field of regard. Gimbal lock is eliminated by installing a lightweight tip mirror to a lightweight elevation gimbal to provide a third axis. This provides aiming without requiring higher gimbal accelerations when pointing in certain directions. The subject system allows an optical source or detector fixed in one reference frame to transmit or receive radiation to or from a target moving relative to the source's frame of reference anywhere in the hemisphere field of regard.

In a preferred embodiment, the subject system comprises three major subsystems. First is a three-axis gimbal; second is a beam-reducing telescope in the gimbal; and third is a stationary optical bench in the gimbal base holding a tracking sensor, a jitter sensor and a high-bandwidth stabilization mirror. Additionally, the subject system includes a digital or analog processor to generate commands for the gimbals and the stabilization mirror as well as the requisite analog electronics to support the gimbals and the mirror.

In the illustrated embodiment the three-axis pointing system includes a relatively massive azimuth gimbal into which is mounted a relatively lightweight elevation gimbal in the form of a rotating drum, with a lightweight tip mirror mounted to the drum, with the tip mirror in one embodiment being limited to plus or minus 10 degrees.

By employing the two-axis pointing system mounted atop the azimuth gimbal, one can eliminate gimbal lock for all orientations of the system, in particular at zenith or nadir, with pointing elements that are exceptionally lightweight to increase bandwidth and to reduce inertia, making heavy motors and positioning actuators unnecessary. Secondly, by employing orthogonal axes for final pointing, feedback and control are dramatically simplified due to de-coupling of the control axes.

Thus, the subject system employs a three-axis beam director or receiver that provides hyper-hemispherical coverage, avoids gimbal lock typical of elevation-over-azimuth beam directors, and allows unobscured use of the full aperture, with the three gimbals providing a 360-degree azimuthal gimbal, an elevation gimbal, and a tip mirror located above the elevation-over-azimuth combined gimbals. In one embodiment, the elevation gimbal provides plus or minus 110-degree motion and the tip mirror provides plus or minus 10-degree optical object space tracking perpendicular to the elevation gimbal motion, with the tip mirror and elevation gimbal providing two-axis pointing. Note that inside a predetermined zone, preferably a 10-degree half-angle cone set at zenith, all pointing functions are obtained. Beyond this cone, the elevation gimbal provides high-bandwidth pointing over its full range, preferably providing pointing over a greater-than-horizontal-to-horizontal horizon range in one axis.

In summary, in the subject three-axis pointing system, the elevation and tip mirror axes are permanently mounted with their rotation axes orthogonal to each other to eliminate gimbal lock over the hemisphere, to avoid high accelerations as the zenith or nadir pointing directions are approached, and to provide optimal two-axis beam pointing control.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
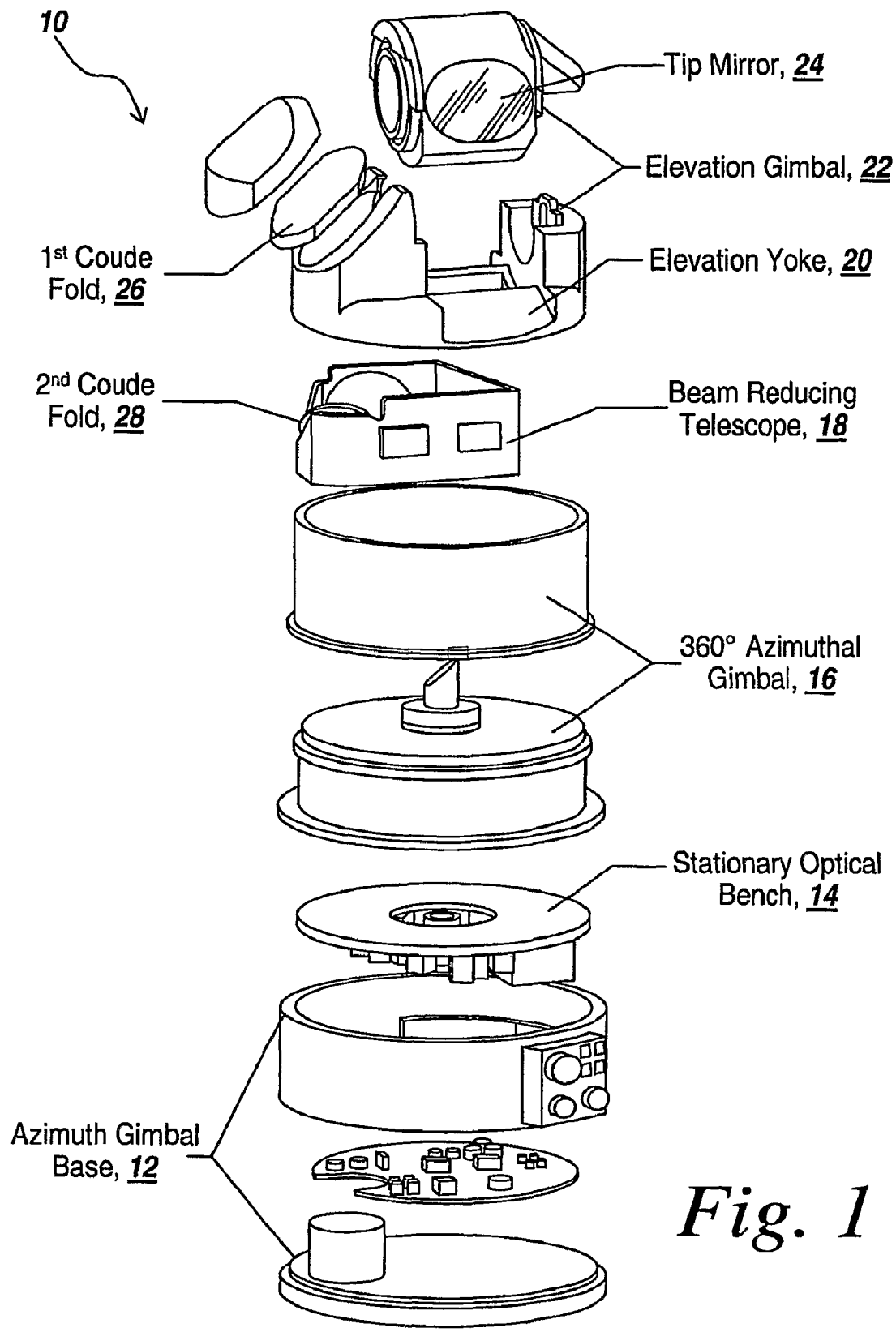
FIG. 1 is an exploded view of the subject optical pointing and tracking system utilizing a three-axis beam director or receiver.

Referring to FIG. 1, what is provided by the subject system is a three-axis beam director or receiver that provides hyper-hemispherical coverage, avoids the gimbal lock typical of El-over-Az beam directors and allows unobscured use of the full aperture. The three-axis system comprises a 360-degree azimuthal gimbal 16, a preferably +/−180 degree elevation gimbal 22, and a tip minor 24, located above the El-over-Az combined gimbals. The tip mirror preferably provides ±10-degree tracking perpendicular to the elevation gimbal motion.

Tip mirror 24 and high-bandwidth elevation gimbal 22 operate as a high speed, 2-axis pointing system. Inside a predetermined cone, preferably a 10-degree half angle cone centered at zenith, they provide all pointing functions. Beyond this cone, the elevation gimbal provides high-bandwidth pointing over its full range, preferably providing pointing over a greater than horizon-to-horizon 220° range in one axis, with the tip mirror providing high bandwidth pointing in the cross-elevation axis. Note the 360°, lower-bandwidth, continuous azimuthal gimbal offloads the tip mirror to point anywhere in the hyper-hemisphere.

In one embodiment, the two inner, lowest inertia, precision gimbal assemblies, i.e., the tip mirror and elevation gimbal, provide high accuracy, high bandwidth pointing with an 80 Hz unity gain bandwidth. Azimuthal accelerations are minimized because the larger azimuth gimbal provides only relatively coarse pointing, at 20 Hz unity gain bandwidth, as it unloads the tip mirror with its 360° continuous motion.

Figure 2:
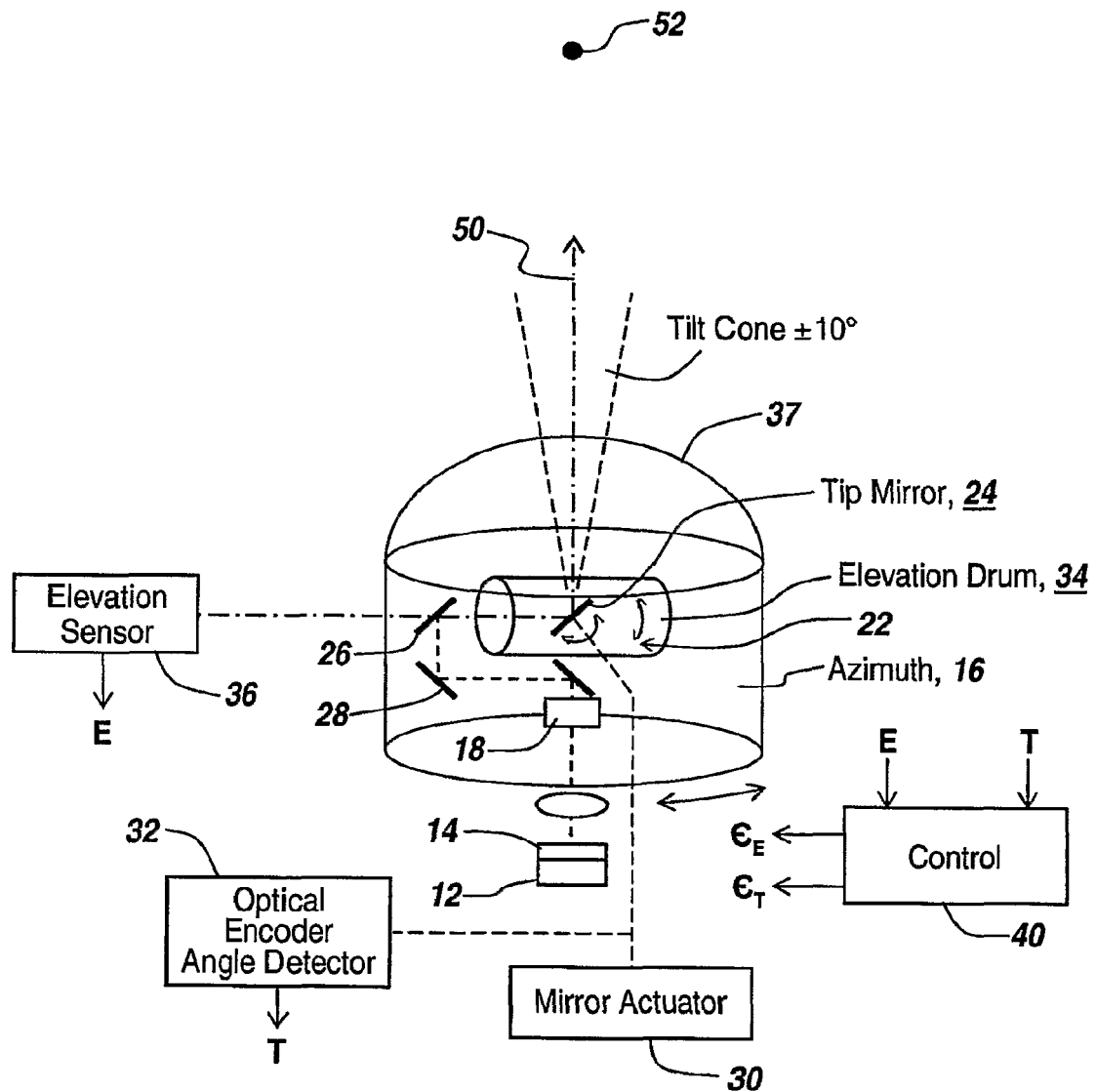
FIG. 2 is a diagrammatic illustration of the three-axis system of FIG. 1 illustrating the optical path through the elements of the beam director or receiver of FIG. 1; and, FIG. 3 is a diagrammatic illustration of the orthogonal axes along the pointing direction for the systems of FIGS. 1 and 2.

Referring to FIG. 2, in one embodiment, a zero-friction rotary voice-coil actuator 30 provides torque to drive the tip mirror and a high-accuracy optical encoder angle detector 32 is installed on one shaft of the mirror. At assembly, the tip mirror is preferably dynamically balanced to place the center of gravity on the tip axis.

The elevation gimbal typically encloses tip mirror gimbal 24 in a horizontal drum 34 fabricated from the same metal selected for the tip mirror gimbal. In one embodiment the drum is 7.5 inches in diameter by 5.6 inches long and made of ¼-inch thick 6061-T6 aluminum. The drum is supported in yoke 20. One end of the drum is open to allow the light from the tip mirror to pass through to a fold mirror 26 in one arm of the yoke. The drum is supported in one embodiment at the open end by a pair of axially-floating large-bore duplex bearings (not shown), while at the other end the electric connections are passed through smaller-bore, rigidly-mounted, duplex bearings (not shown). Another angle sensor, elevation sensor 36, is installed on this end shaft. This gimbal is powered in one embodiment by a three-phase DC brushless motor. The tip mirror points out through the clear aperture of a flat or curved window 37. An access panel may be incorporated to allow the fully assembled and balanced tip mirror to be inserted and attached. This gimbal is also preferably dynamically balanced at assembly.

Elevation gimbal 22 is supported by a conventional yoke with a 4-inch coudé path filling one arm and the electrical connections from the tip mirror filling the other.

The elevation yoke forms the top surface of the azimuth gimbal structure 16. After traveling down the coudeé arm including mirror 26, the optical path enters beam reducing telescope 18, which is located inside the azimuth gimbal structure in a thermally controlled environment that limits thermal gradients to, typically, <3° C. Alternatively, a thermally insensitive telescope comprised of low-expansion materials may be used in lieu of temperature control. The beam-reducing telescope is designed to move the beam from the edge of the azimuth gimbal under the arm of the yoke to the center of the azimuth gimbal, where it is directed through a bearing, and, simultaneously, to shrink the diameter of the beam to reduce the azimuthal gimbal bearing diameter. In one embodiment the beam is reduced to 0.5" in diameter and is directed through the center of the azimuth gimbal to the stationary optical bench 14 below.

The azimuth gimbal structure in one embodiment is roughly a cylinder, 13.5 inches in diameter by 13 inches tall, also fabricated from the same material as the other structural elements. The rotating portion of the azimuth gimbal structure moves relative to stationary azimuth gimbal base 12. The rotating portion is a turntable with a central, hollow, axial shaft supported by bearings in the gimbal base. Quadruplex and/or duplex ball bearings are typically selected to carry the weight and provide stiffness with low friction. The gimbal is powered by, typically, a brushless motor; a 2-phase DC motor provides 600 in-oz of torque in the exemplary embodiment. A slip ring enables 360° continuous rotation by providing electrical connections for the tip and elevation gimbal motors, and encoders. Angle encoders are also provided on the azimuth gimbal. High-accuracy encoders are used on all three axes to provide position feedback during acquisition pointing, acquisition search scanning, and "coasting" during dropout of the tracking signal.

The stationary optical bench 14 is located atop azimuth gimbal base 12. In one embodiment the base is 16 inches in diameter by 8.5 inches tall and fabricated from ¼-inch thick 6061-T6 aluminum. Preferably, isolators provide passive isolation from the platform on which the apparatus is mounted. Optionally, an inertial measurement unit, IMU, is mounted on the base.

The present invention uses three gimbals (Az, El and Tip) to point/track over a two-dimensional space (Az and El). It is recognized that a two-axis (Az-El) gimbal has two performance issues. First, a two-axis gimbal suffers from gimbal lock, that is, at zenith the azimuth angle is undefined. Second, particularly near zenith, the azimuthal acceleration requirement becomes impossible to meet. The subject pointing apparatus overcomes these difficulties by adding the tip mirror. In the apparatus, the tip mirror and the elevation gimbal may be thought of as a high bandwidth, two-axis pointing system that operates over a 10×10 degree field. The azimuthal gimbal, combined with the elevation gimbal, can be thought of as a transport system for directing the high bandwidth pointing system to any desired region in the full spherical field of regard.

A tracking camera may be located on the stationary optical bench. The position of the point source image in the field of view of the tracking camera can provide input data to a gimbal servo control system. Typically, the servo control system generates drive commands for the gimbal actuators, which move the point source image to a predetermined spot in the camera's field of view.

The tracking camera can have an adjustable field of view and may be used for both acquisition and tracking.

In another embodiment, the subject system also can include a two-axis fast steering mirror (FSM) and a jitter sensor, both typically located on the stationary optical bench. The sensor/FSM combination forms an independent control loop to reduce the residual jitter left over by the main, three-axis gimbal. The jitter sensor and FFM only "see" the light coming out of the main gimbal, which has brought the point source image close to the predetermined point in the field of view. Therefore, the jitter sensor/FSM combination only requires limited range to compensate for the small residual displacement. The range limit allows the FSM to have a high bandwidth to provide maximum jitter control. In one embodiment the FSM mirror can be mated with a three-channel high voltage amplifier and a two-channel strain gage bridge interface and the jitter sensor is a quad-cell.

The subject system also includes a control system 40 for driving the three-axis beam director or receiver. The control system preferably comprises two independent control loops: the system pointing/tracking loop, represented preferably by an Acquisition/Tracking camera and the 3-axis gimbal and beam jitter control loop represented preferably by a quad cell tracker and the FSM.

System pointing/tracking loop is generally designed to provide both acquisition and, after a target has been acquired, pointing/tracking. Acquisition is typically accomplished using the optional Inertial Navigation System.

Referring again to FIG. 2, from a conceptual standpoint what is depicted is a three-axis pointing system that is used to eliminate gimbal lock. Here zenith 50 is shown. It is the purpose of the system to be able to move the line of sight around even at the zenith so as to be able to track an object 52, which is at or close to the zenith.

In order to eliminate gimbal lock, a lightweight three-axis system is provided by mounting elevation drum 34 within the azimuth gimbal 16 and by mounting the tip mirror 24 within the drum such that their rotational axes are orthogonal. In one embodiment, tip mirror 24 is constrained to a ±10° tilt zone.

It is also noted that the combination of the elevation drum and the tip mirror provide an orthogonal two-axis system for line of sight control.

Because there is an elevation sensor on the axis of the elevation drum and an optical encoder that provides an angle detector for the tip mirror, tilt and elevation are sensed and coupled to control unit 40 from which control of the elevation drum and tip mirror can be achieved. These controls rely on the fact that the elevation and tip mirrors are de-coupled to provide a simple control system for the movement of the line of sight for the system.

Since a tip mirror is used to prevent co-axial alignment of any two of the three axes of the three-axis system, there is no requirement to offset the gimbal lock point. This establishes complete hemispherical coverage without gimbal lock, and with the use of lightweight tip and elevation components provides exceedingly high bandwidth.

Figure 3:
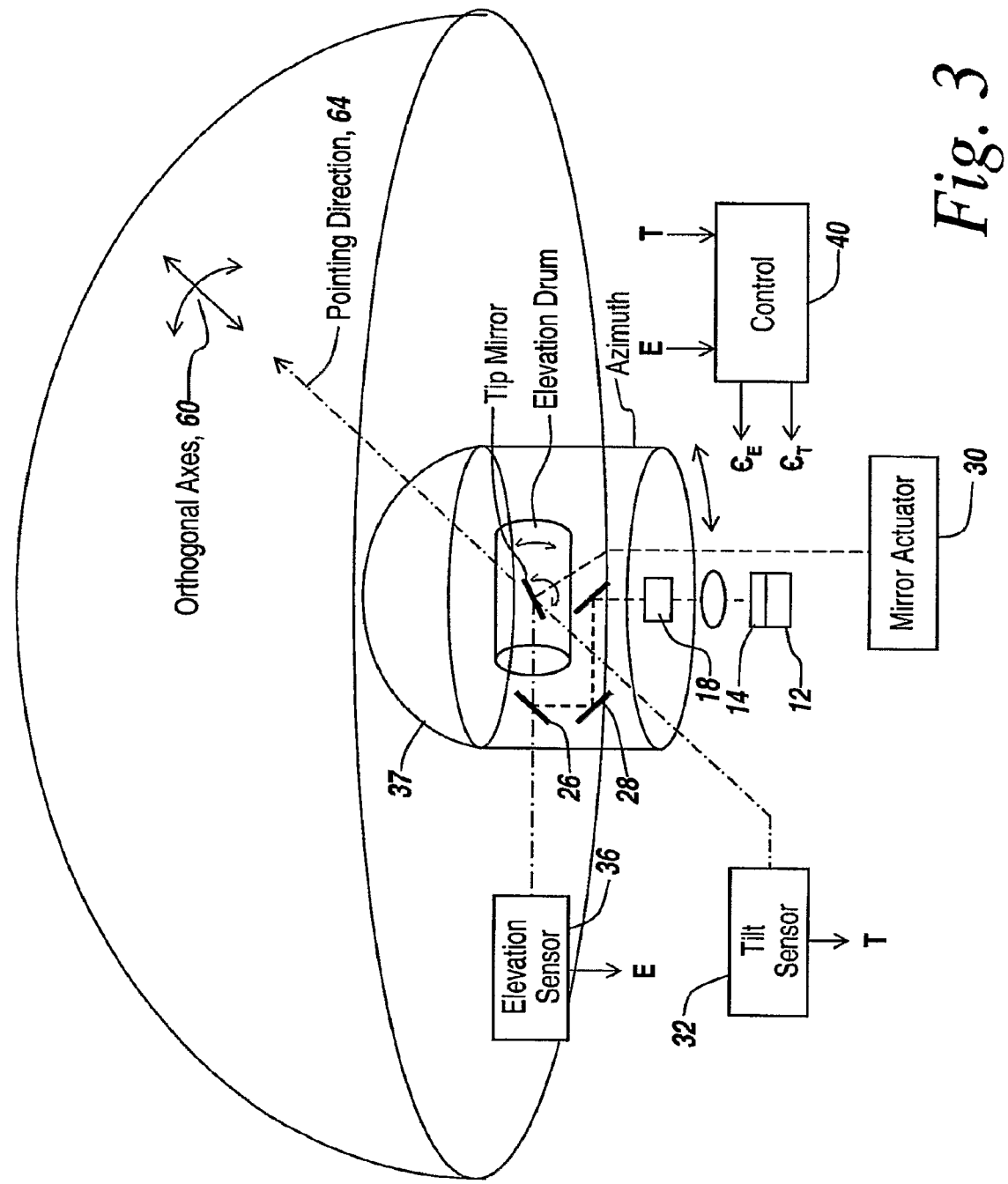

Referring to FIG. 3, the system of FIG. 2 by its very nature provides two orthogonal axes 60 and 62 along the pointing direction 64 so as to provide for beam pointing and the de-coupling noted above. With sensors on the drum and tip mirror axes to detect position, any errors can be rapidly transmitted to associated actuators, which also act along the same axes.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for eliminating gimbal lock in an optical pointing system, comprising the steps of:

providing a pointing system with an azimuthal gimbal, an elevation gimbal mounted on the azimuthal gimbal, and a tip mirror mounted on the elevation gimbal, the azimuth gimbal, elevation gimbal and tip mirror having respective rotational axes; and, orienting the rotational axis of the tip mirror such that the rotational axis of the tip mirror is orthogonal to the rotational axis of the elevation gimbal, the pointing system having a pointing direction and wherein the elevation gimbal and the tip mirror provide two-axis control about the pointing direction, the azimuth gimbal being used to orient the pointing system so as to orient the elevation and tip mirror axes orthogonal to the pointing direction.

2. The method of claim 1, wherein the tip mirror is lightweight to limit inertia and to provide high bandwidth.

3. The method of claim 2, wherein the elevation gimbal includes a lightweight drum having low inertia and high bandwidth, whereby the pointing system takes on the characteristics of a low-inertia, high-bandwidth system.

4. The method of claim 1, wherein the pointing system has a pointing direction and wherein the tip mirror axis and elevation axis are orthogonal to each other about the pointing direction of the optical pointing system.

5. The method of claim 4, wherein the control of the pointing direction includes independent control of the elevation gimbal and the tip mirror, whereby the tip mirror and the elevation gimbal are de-coupled and independently controllable.

6. The method of claim 1, whereby the tip mirror rotation angle is limited to plus or minus 90 degrees to avoid gimbal lock over an entire hemispherical field of regard.

7. Apparatus for high-accuracy optical pointing, comprising:
   an azimuth gimbal;
   an elevation gimbal mounted on said azimuth gimbal;
   a tip mirror gimbal mounted on said elevation gimbal; and,
   an optical path through said azimuth gimbal and said elevation gimbal to said tip mirror gimbal so as to establish a pointing direction for said optical pointing apparatus.

8. The apparatus of claim 7, wherein said optical path includes at least one coudé fold.

9. The apparatus of claim 8, wherein said optical path includes a second coudé fold.

10. The apparatus of claim 9, and further including a beam-reducing telescope in said optical path between said azimuth gimbal and said elevation gimbal.

11. The apparatus of claim 7, wherein said tip mirror is rotatable about a rotation axis.

12. The apparatus of claim 11, wherein the tip mirror rotation is such as to avoid gimbal lock while pointing to any direction within a hemisphere.

13. The apparatus of claim 12, wherein said tip mirror has an angle of incidence of 45° ±10°.

14. The apparatus of claim 7, and further including a sensor for sensing the angular orientation of said tip mirror; and, a control system for controlling the angular position of said tip mirror based on the output of said sensor.

15. The apparatus of claim 14, and further including a second sensor for sensing the angular orientation of said elevation gimbal, and wherein said control system includes controlling the angular orientation of said elevation gimbal, whereby the control of said tip mirror and control of said elevation gimbal are decoupled.

16. The apparatus of claim 7, wherein the rotational axes of said tip mirror and said elevation gimbal are orthogonal and the tip mirror motion is limited to plus or minus 90 degrees, thereby to avoid gimbal lock over the entire hemisphere.

17. The apparatus of claim 7, wherein said elevation gimbal has a rotational axis and wherein said tip mirror has a normal thereto that never lines up with the rotational axis of said elevation gimbal.

18. The apparatus of claim 17, wherein said tip mirror has an angle of incidence of 45° ±10.

* * * * *